United States Patent
Naftali et al.

(10) Patent No.: US 10,663,748 B2
(45) Date of Patent: May 26, 2020

(54) METHODS AND LASER SYSTEMS FOR REDUCTION OF UNDESIRED SPECKLE

(71) Applicant: MARADIN TECHNOLOGIES LTD., Yoqne'am Ilit (IL)

(72) Inventors: Matan Naftali, Moshav Aloney-Aba (IL); Inbal Herer, Kibbutz Ramat Hashofet (IL); Adi Baram, Yoqneam (IL); Menashe Yehiel, Moshav Yogev (IL)

(73) Assignee: MARADIN TECHNOLOGIES LTD., Yoqne'am Ilit (IL)

( * ) Notice: Subject to any disclaimer, the term of this patent is extended or adjusted under 35 U.S.C. 154(b) by 0 days.

(21) Appl. No.: 15/777,731

(22) PCT Filed: Nov. 22, 2016

(86) PCT No.: PCT/IL2016/051255
§ 371 (c)(1),
(2) Date: May 21, 2018

(87) PCT Pub. No.: WO2017/085729
PCT Pub. Date: May 26, 2017

(65) Prior Publication Data
US 2018/0348537 A1    Dec. 6, 2018

Related U.S. Application Data (60) Provisional application No. 62/258,469, filed on Nov. 22, 2015.

(51) Int. Cl.
*G02B 27/48* (2006.01)
*G02B 27/01* (2006.01)
(Continued)

(52) U.S. Cl.
CPC .......... *G02B 27/48* (2013.01); *G02B 27/01* (2013.01); *G03B 21/208* (2013.01);
(Continued)

(58) Field of Classification Search
CPC .... G02B 27/01; G02B 27/48; G03B 21/2033; G03B 21/14; H04N 9/3129; H04N 9/31
See application file for complete search history.

(56) References Cited

U.S. PATENT DOCUMENTS

| | | | | |
|---|---|---|---|---|
| 7,030,383 | B2 * | 4/2006 | Babayoff | G02B 21/0056 250/370.08 |
| 8,469,519 | B2 * | 6/2013 | Marcus | G03B 21/567 353/31 |

(Continued)

FOREIGN PATENT DOCUMENTS

CN    102681198 A    9/2019

OTHER PUBLICATIONS

A Sony mobile projector which uses a Wavelength diversity method to reduce speckles (Oct. 29, 2016): https://web.archive.org/web/20161029094220/http://www.sony.com/electronics/portable-projectors/mp-cl1a.

(Continued)

*Primary Examiner* — William C. Dowling
(74) *Attorney, Agent, or Firm* — Browdy and Neimark, PLLC (57) ABSTRACT

A system and method for using a laser, including using a coherent light source to generate a beam having a dominant wavelength wl; and providing along the beam's light path, at least one optical element having a surface upon which the beam impinges, whose roughness is between D and ½ wl–D where D is double the tolerance of the laser's dominant wavelength.

20 Claims, 3 Drawing Sheets

---

300: provide laser system including coherent light source which generates a beam with dominant wavelength wl

↓

320: provide optical element/s having a surface upon which the beam is to impinge, whose roughness is between D and 1/2wl- D (example: D = 2 x tolerance of laser's dominant wavelength)

↓

330: position the optical element/s along the beam's light path such that the beam impinges on the surface whose roughness is between D and 1/2wl- D

↓

340: optionally, pre-test (operate laser system) to ascertain that roughness between D and 1/2wl- D yields a laser system with application-acceptable level of speckle; if not, consider increasing D e.g. by replacing optical element with another optical element to be pre-tested, whose roughness is further from 0 and/or ½ wl; if so, and if justified by counter-considerations supporting low roughness, consider decreasing D e.g. by replacing optical element with another optical element to be pretested, whose roughness is closer to 0 and/or ½ wl (51) Int. Cl.
  *G03B 21/20* (2006.01)
  *H04N 9/31* (2006.01)
(52) U.S. Cl.
  CPC ....... *G03B 21/2033* (2013.01); *H04N 9/3129* (2013.01); *H04N 9/3161* (2013.01)

(56) References Cited

U.S. PATENT DOCUMENTS

| | | | |
|---|---|---|---|
| 9,895,056 B2* | 2/2018 | Klaffenbach | A61B 3/0008 |
| 2009/0213330 A1 | 8/2009 | Silverstein et al. | |
| 2009/0257106 A1* | 10/2009 | Tan | G02B 27/48 359/279 |
| 2010/0014141 A1 | 1/2010 | Lapchuk et al. | |
| 2011/0285967 A1* | 11/2011 | Gollier | G02B 27/48 353/20 |
| 2012/0188515 A1 | 7/2012 | Huang | |
| 2014/0126033 A1 | 5/2014 | Hirata et al. | |

OTHER PUBLICATIONS

Chellappan, K. V., Erden, E., & Urey, H. (2010). Laser-based displays: a review. Applied optics, 49(25), F79-F98.

Wikipedia entry for Surface Roughness (May 17, 2015): https://en.wikipedia.org/w/index.php?title=Surface_roughness&oldid=662744134.

"Role of Surface Roughness in Optical Performance", Brandon Light, Optimax Systems, Inc. 2011 https://www.optimaxsi.com/PDFs/SurfaceRoughnessRevA.pdf.

Wikipedia entry for Speckle pattern (Oct. 30, 2015): https://en.wikipedia.org/w/index.php?title=Speckle_pattern&oldid=688194214.

* cited by examiner

300: provide laser system including coherent light source which generates a beam with dominant wavelength wl

↓

320: provide optical element/s having a surface upon which the beam is to impinge, whose roughness is between D and 1/2wl- D (example: D = 2 x tolerance of laser's dominant wavelength)

↓

330: position the optical element/s along the beam's light path such that the beam impinges on the surface whose roughness is between D and 1/2wl- D

↓

340: optionally, pre-test (operate laser system) to ascertain that roughness between D and 1/2wl- D yields a laser system with application-acceptable level of speckle; if not, consider increasing D e.g. by replacing optical element with another optical element to be pre-tested, whose roughness is further from 0 and/or ½ wl; if so, and if justified by counter-considerations supporting low roughness, consider decreasing D e.g. by replacing optical element with another optical element to be pretested, whose roughness is closer to 0 and/or ½ wl

METHODS AND LASER SYSTEMS FOR REDUCTION OF UNDESIRED SPECKLE

REFERENCE TO CO-PENDING APPLICATIONS

Priority is claimed from U.S. Provisional Patent Application No. 62/258,469 entitled "Speckle Reducer Interposer" filed Nov. 22, 2015, the disclosure of which is hereby incorporated by reference.

FIELD OF THIS DISCLOSURE

The present invention relates generally to optical devices which use coherent light sources, More particularly, this invention relates to laser based projection devices.

BACKGROUND FOR THIS DISCLOSURE

Speckle patterns typically occur in diffuse reflections of monochromatic light such as laser light. The speckle effect results from interference of many waves of the same frequency, having different phases and amplitudes, which, together, give a resultant wave whose amplitude, and therefore intensity, varies randomly.

In many laser based displays and sensors, this phenomenon is observed as being the use of coherent light sources with a narrow wave length span. When an image is formed of a rough surface which is illuminated by a coherent light (e.g. a laser beam), a speckle pattern is observed in the image plane.

Speckle is considered to be a problem in laser based display systems (e.g. in laser television and laser projectors) and in laser sensing systems (e.g., LiDAR systems). According to Wikipedia, "speckle is usually quantified by the speckle contrast. Speckle contrast reduction is essentially the creation of many independent speckle patterns, so that they average out on the retina/detector".

Conventional methods of speckle reduction include:
1. Angle diversity: Illumination from different angles.
2. Polarization diversity: Use of different polarization states.
3. Wavelength diversity: Use of laser sources which differ in wavelength by a small amount.
For example, a SONY picoprojector which uses a Wavelength diversity method to reduce speckles, by providing multiple sources of the same color with variance in wavelength and optical path is described at http://ww.sony.com/electronics/portable-projectors/mp-clla")
4. Rotating diffusers—which destroy the spatial coherence of the laser light—can also be used to reduce the speckle.
5. Moving/vibrating screens may also be solutions. The Mitsubishi Laser TV appears to use such a screen which requires special care according to their product manual. A more detailed discussion on laser speckle reduction can be found in Kishore V. Chellappan, Erdem Erden, and Hakan Urey, "Laser-based displays: a review," Appl. Opt. 49, F79-F98 (2010), which is not available to Applicant.
6. Micro-lens array screen (MLA) which controls the diffuser characteristic.
7. Synthetic array heterodyne detection was developed to reduce speckle noise in coherent optical imaging and coherent differential absorption LIDAR.
8. In scientific applications, a spatial filter can be used to reduce speckle.

The disclosures of all publications and patent documents mentioned in the specification, and of the publications and patent documents cited therein directly or indirectly, are hereby incorporated by reference. Materiality of such publications and patent documents to patentability is not conceded

SUMMARY OF CERTAIN EMBODIMENTS

Devices which utilize coherent light sources, e.g. lasers, are subject to the speckle phenomenon which may be observed on the image surface. As a result, image quality is degraded, and certain embodiments seek to improve this.

Certain embodiments seek to provide at least one optical element, and a method for using a laser, the method comprising using a coherent light source to generate a beam having a dominant wavelength wl; and providing along the beam's light path, at least one optical element having a surface upon which the beam impinges, whose roughness is between D and ½ wl–D, where D is a suitable parameter such as 1 or 1.5 or 2 or 2.5 times the tolerance of the laser's dominant wavelength or 6 or 8 or 10 or 12 or 15 or 20 nm.

Certain embodiments described henceforth, present a new method for speckle reduction for laser based optical systems.

There is thus provided, in accordance with some embodiments of the present invention, a method and an optical device for reducing the speckle effect which may comprise any or all of:

a) An image plane e.g. which serves as an optical interposer b) An image plane that has a random surface pattern c) A surface or element along the optical path from the laser to the eye e.g. screen/diffuser with a specific optical grade finish which is not an integer multiple of half the laser's wavelength.

Certain embodiments presented here include a new architecture of the optical interposer's surface for reducing unwarranted speckle from an image plane. Certain embodiments improve performance relative to state-of-the-art solutions, while reducing the cost and complexity of such solutions, and enhancing presentation of the image itself.

Embodiments may include:

Embodiment A an (optionally tilted) optical protective structure which has a unique architecture comprising an optical structure placed or manufactured as part of the optical path of a coherent light image generation device (e.g., laser scanning based Head Up Display)

Embodiment b

The device of Embodiment A that has a random surface pattern.

Embodiment c

The device of Embodiment A that has a surface grade finish in the ranges of ¼th to ⅛th of the lowest and highest wavelengths with respect.

Embodiment d

The device of Embodiment A that is formed of different materials such as: plastic; Silicon; Ceramic (e.g., Al2O3);

Compound materials etc., according to the system requirements for functionality and cost of the optical device.

Embodiment c

The device of Embodiment A that is formed by different methods such as: plastic molding; fine machining process, sintering etc.

Embodiment f

The device of Embodiment A that could work with other speckle reduction methods such as: rotating, differing wavelength lasers etc. The device may include surface treatment for surface roughness control such as but not limited to: optical coating, antireflective coating, polymer coating, multilayer coating.

The present invention typically also includes at least the following embodiments:

Embodiment 1

A method for using a laser, the method comprising:
using a coherent light source to generate a beam having a dominant wavelength wl; and
providing along the beam's light path, at least one optical element having a surface upon which the beam impinges, whose roughness is between D and ½ wl–D where D is double the tolerance of the laser's dominant wavelength.

The beam having impinged on an optical element may be reflected therefrom, wholly or in part, or may pass therethrough, wholly or in part.

The optical element may be formed of any suitable material, such as glass, alumina or any other ceramic, any suitable plastic such as Polycarbonate, any suitable metal such as Aluminum.

Optionally, the optical element undergoes surface treatment for surface roughness control. The treatment may include at least one of: optical coating, antireflective coating, polymer coating, multilayer coating.

Typically, the roughness is as far as possible from "dangerous" roughness values which are integer multiples of 0.5 wl including zero and the acceptable distance from these dangerous values, can be determined empirically per laser because, for example, the acceptable distance may be affected by the laser's spectral width.

The optical element may be manufactured to have an average roughness with a tolerance defining a bottom endpoint roughness and a top endpoint roughness and these endpoints are each at least, say, ⅛ wl away from 0, 0.5 wl and 1 wl. For example, the bottom endpoint may be >=⅛ wl and the top endpoint may be <=⅜ wl. Alternatively, the endpoints may each be, say, at least 1/10 wl, 1/16 wl or 1/20 wl, or 5 nm, 10 nm, or 15 nm or 20 nm, away from 0, 0.5 wl and 1 wl. In theory, the bottom endpoint may be >=⅝ wl and top endpoint <=⅞ wl, or the bottom endpoint may be >=⅝ wl and top endpoint <=1⅛ wl however, in practice, this may only be achievable if the surface processing is reliable enough to ensure that local roughness is never 0.5 WL.

Embodiment 2

A method according to any of the preceding embodiments wherein the roughness is between ¼ and ⅛ of wl.

Embodiment 3

A method according to any of the preceding embodiments wherein the roughness is between 75 and 90 nanometers.

Embodiment 4

A method according to any of the preceding embodiments and also comprising providing a display surface on which an image is generated by the laser beam.

Embodiment 5

A method according to any of the preceding embodiments wherein the optical element comprises the display surface.

Embodiment 6

A method according to any of the preceding embodiments wherein using comprises using plural coherent light sources to generate plural beams having respective dominant wavelengths wl1, wl2, . . . ; and wherein the optical element has a surface whose roughness is greater than 10 nanometers and less than the shortest of the dominant wavelengths wl1, wl2, . . . .

For example, an optical element having a 100 nm roughness value is ¼ of 4000 angstrom and is ⅛ of 8000 angstrom hence may be used according to certain embodiments both for a first laser source with a wavelength of, say, 4500 angstrom and for a second laser source with a wavelength of, say, 6300 angstrom.

Embodiment 7

A method according to any of the preceding embodiments wherein using comprises using plural coherent light sources to generate plural beams having respective dominant wavelengths wl1, wl2, . . . ; and wherein providing comprises providing plural optical elements for positioning along the beams' respective light-paths, having plural surfaces respectively whose respective roughnesses are greater than 10 nanometers and are D less than the dominant wavelengths wl1, wl2, . . . respectively.

For example, if wl2 is 450 nm, an optical element for positioning along the associated beam's light path, may have a roughness whose wavelength is ⅙×4570 Angstrom=about 75 nm.

Embodiment 8

A method according to any of the preceding embodiments wherein the optical element comprises at least one of: lens, display screen, mirror, diffuser, image plane, optical cover, optical coating.

Embodiment 9

A method according to any of the preceding embodiments wherein the laser serves at least one of: laser based display system such as a laser television or laser projector; and a laser sensing system such as a LiDAR.

Embodiment 10

A method according to any of the preceding embodiments and also comprising providing an optical element having a surface whose roughness exceeds wl and reducing the roughness to between 10 nanometer and wl using a mechanical process.

Embodiment 11

A method according to any of the preceding embodiments wherein the mechanical process comprises any of: etching, molding, polishing, machining, lapping, electro-polishing, grinding, boring.
Any suitable parameter or operation or material may be varied in any of the above processes, in order to achieve the appropriate (in terms of laser wavelength) roughness, for example, the particle size of the slurry used for polishing may be suitably selected. Another example is that if etching is used to manufacture the optical element, parameters that may be controlled while etching in order to control the resulting roughness include process temperature and process rate. Slow process and constant low temperature yield a finer surface whereas higher speed and/or temperature yield a rougher surface.

Embodiment 12

A method according to any of the preceding embodiments wherein the mechanical process comprises polishing including using a slurry having a particle size and wherein the particle size is selected to achieve roughness of between 10 nanometer and wl.

Embodiment 13

A method according to any of the preceding embodiments and also comprising providing an optical element having a surface whose roughness is less than 10 nm and increasing the roughness to between 10 nanometer and wl using a roughening process.

Embodiment 14

A method according to any of the preceding embodiments wherein the optical element is manufactured by a molding process characterized by a known, controlled relationship (tolerance) between a workpiece's roughness as a function of the mold's roughness and wherein the mold has a roughness which, given the tolerance, results in a workpiece whose roughness is between 10 nanometer and wl.

Embodiment 15

A method according to any of the preceding embodiments wherein the machining comprises selecting a machining tool which yields roughness between 10 nanometer and wl in a workpiece machined thereby.

Embodiment 16

A method according to any of the preceding embodiments wherein the laser based display system comprises a laser projector.

Embodiment 17

A method according to any of the preceding embodiments wherein the roughness is between 10 nanometer and ½ wl–10 nm.

Embodiment 18

A method according to any of the preceding embodiments wherein the roughness is between 15 nanometer and ½ wl–15 nm.

Embodiment 19

A method according to any of the preceding embodiments wherein the roughening process comprises etching.

Embodiment 20

A laser system comprising: a coherent light source operative to generate a beam having a dominant wavelength wl; and positioned along the beam's light path, at least one optical element having a surface upon which the beam impinges, whose roughness is between D and ½ wl–D where D is double the tolerance of the laser's dominant wavelength.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs, RAMs, ROMs, EPROMs, EEPROMs, magnetic or optical or other cards, for storing, and keyboard or mouse for accepting. Modules shown and described herein may include any one or combination or plurality of a server, a data processor, a memory/computer storage, a communication interface, a computer program stored in memory/computer storage.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

Methods and systems included in the scope of the present invention may include some (e.g. any suitable subset) or all of the functional blocks shown in the specifically illustrated implementations by way of example, in any suitable order e.g. as shown.

Any hardware component mentioned herein may in fact include either one or more hardware devices e.g. chips, which may be co-located or remote from one another.

DETAILED DESCRIPTION OF CERTAIN EMBODIMENTS

Laser datasheets typically stipulate the laser's typical wavelength (aka dominant wavelength herein) and a plus-minus tolerance. For example, Osram's PL520 laser has a typical emission wavelength of 520 nm (nanometer), and the minimal and maximal values are stipulated to be 515 and 530 nm respectively.

Roughness can be measured using any suitable technology such as but not limited to atomic force microscope/scanning electron microscopy/optical microscopy, manual comparison against a "surface roughness comparator" (e.g. sample of known surface roughnesses), surface profile measurement made with a contact (e.g. diamond stylus) or optical (e.g. white light interferometer) profilometer.

Any suitable roughness parameter (such as but not limited to roughness height, peak-to-valley height, Ra, Rq, Rmax or others tabled in the Wikipedia entry for Surface Roughness) or any suitable combination of such roughness parameters, and any suitable standard such as but not limited to a DIN or ISO (e.g. ISO 4287:1997) standard, may be employed to operationalize the term "roughness" as used herein. Typically, roughness is operationalized as a central tendency (e.g. mean, mode, median, other) of deviations of an actual surface from its ideal form, where deviations are typically taken, at each point, along a perpendicular, at that point, to the ideal form of the surface.

Conventionally, smooth optical surfaces are valued. The less rough the surface is, the better. A high roughness value is usually regarded as undesirable e.g. because (Wikipedia) "Rough surfaces usually wear more quickly and have higher friction coefficients . . . . Roughness is often a good predictor of the performance of a mechanical component, since irregularities in the surface may form nucleation sites for cracks or corrosion." Specifically, for optical elements, specifying a maximum allowable roughness has been deemed desirable e.g. because this "limits light losses due to wide-angle scatter" ("Role of Surface Roughness In Optical Performance", Brandon Light, Optimax Systems, Inc. 2011, available on the web). Also, avoiding roughness promotes energy efficiency.

Roughness is normally only considered desirable or acceptable, rather than as a drawback, in situations where it is desired to promote adhesion, or in order to reduce manufacturing costs or to prevent a visible surface from looking too shiny to the eye, or to prevent a manipulated surface, e.g. touchpad, from being too slippery for the operator's finger.

According to certain embodiments, roughness is desirable to a limited extent—in order to ensure that the roughness magnitude is not a multiple of 0.5×laser wavelength. So, according to certain embodiments, zero roughness or roughness very close to zero is not desirable.

Figure 1:
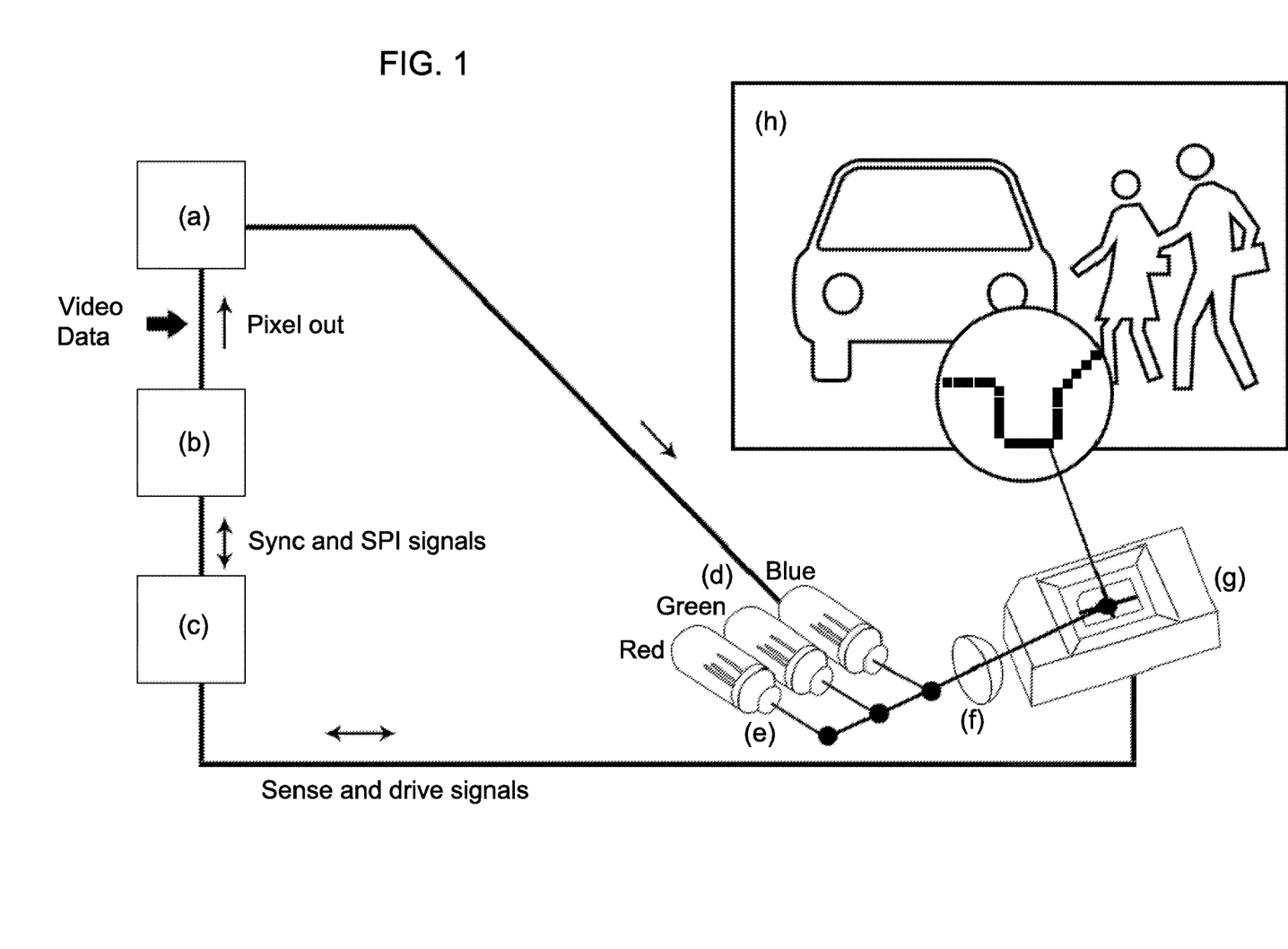
FIG. 1 illustrates an example embodiment in which speckle reduction is achieved for a Laser based projecting system operating in at least one and perhaps plural e.g. 3 laser wavelengths wl1, wl2, wl3.

FIG. 1 is an example embodiment in which speckle reduction is achieved for a Laser based projecting system operating in at least one and perhaps plural e.g. 3 laser wavelengths wl1, wl2, wl3. As shown, the apparatus of FIG. 1 may include some or all of:

(a) A laser driver; (b) a laser timing algorithm and associated processor e.g. a MAR3100 available from Maradin; (c) a MEMs drive & control unit e.g. a MAR 2100 available from Maradin: (d) laser diode and associated optics e.g. (e) beam shape optics and/or (f) focusing optics; and (g) a scanning impinging surface e.g. a 2D MEM scanner mirror e.g. MAR 1100 available from Maradin; as well as (h) a screen diffusing surface.

Roughness which is not an integer multiple of any of the following; 0.5 wl1, 0.5 wl2, 0.5 wl3 is provided for any one or more of: optics implemented on every color (e.g. collimation lenses and/or beam shaping lenses (not shown) within the laser diode), optics after the beam is united (e.g. focusing optics, mirror surface, screen surface).

More generally, for any laser apparatus hampered by undesirable speckle, the desired roughness which is not an integer multiple of 0.5 wl of whatever laser/s is/are employed, may be provided in any optical element e.g. the mirror/scanning impinging surface, and/or any lens or lenses within the focusing optics and/or any optical element or elements within the 3 (R, G, B) beam shape optics and/or, of course, the screen diffusing surface (display screen e.g.).

Figure 2:
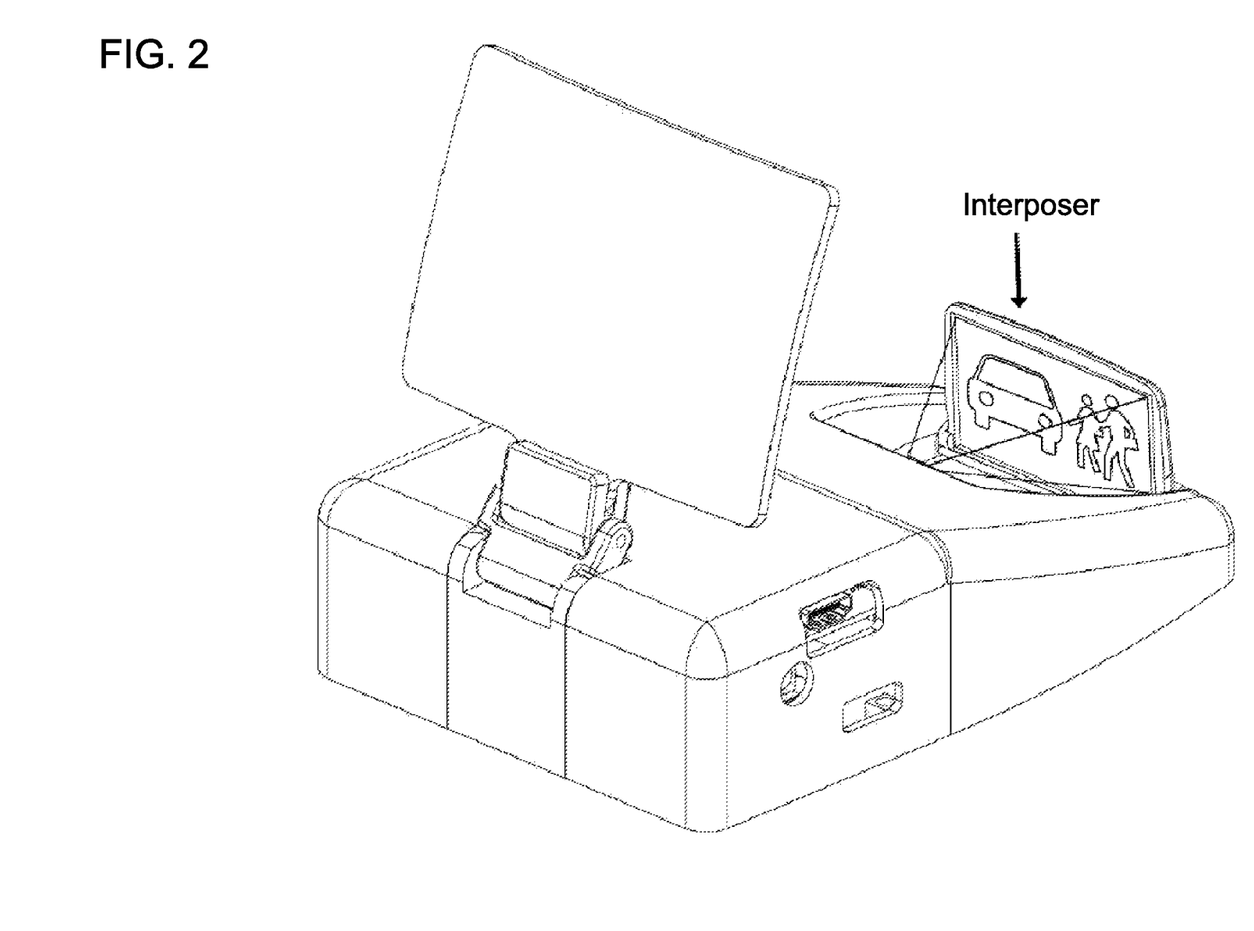
FIG. 2 illustrates a Head-Up-Display system, including an Optical Interposer in its optical path which implements an embodiment of the present invention.

FIG. 2 illustrates a Head-Up-Display system, including an optical interposer in its optical path which implements an embodiment of the present invention. The image may be created, e.g. projected on the optical interposer, using the apparatus of FIG. 2 and conventional laser scanning. From the optical interposer, the image may be reflected on a transparent mirror that enables creation of a virtual image on the viewer's eye.

The manufacturing of the optical interposer with surface finish in accordance with any embodiment of the invention described herein, may be accomplished by any suitable method such as, but not limited to: ceramic polishing techniques, plastic molding, fine machining. The optical window may be made of any suitable material, such as but not limited to metal, alumina, plastic. For example, plastic molding may be used for an optical interposer assembled as part of a laser based Head-Up-Display (HUD) system since plastic molding is a cost effective method for manufacturing tilted surfaces with highly controlled accuracy and optical grade.

An Atomic Force Microscope (AFM) surface scanning the optical interposer's surface would show roughness according to any embodiment shown and described herein. Typically, such a surface bears a random pattern, to eliminate unwarranted interferences and reflections from the surface itself. Example dimensions of such a surface optical grade finish may be: average value computed by the AFM—6.98 micrometer, average roughness Ra—74.9 nm, RMS roughness Rq 94.49 nm, and peak-to-valley roughness parameter Rt—765.4 nm. These dimensions are in the range of ¼th to ⅙th of the lowest wave length for the interposer which is about 450 nm for visible light, and are in the range of up to ⅛th of the highest wavelength for the interposer which is about 630 nm.

In order to measure roughness e.g. of the interposer or screen in FIG. 2, or any other optical element whose roughness is to be or has been controlled in accordance with certain embodiments, any suitable surface profiler tool, such as an AFM (Atomic Force Microscope), Mechanical profiler or Optical profiler may be employed. Typically, several, e.g. 3-5 typical surface areas, are used to perform the roughness parameter measurement. If the average roughness is not an integer multiple (including zero) |of 0.5×laser wavelength, the interposer may be expected to act as a speckles reduction element.

According to certain embodiments, at least one optical element along the laser's path should be characterized by roughness which is as far as possible from "speckle-prone" roughness values which are multiples of 0.5 wl where in practice the safe distance from these speckle-prone values can be determined empirically per laser, e.g. by testing a given laser and associated laser display system while varying roughness for a given optical element in the system e.g. varying height of roughness, computing the distance of each roughness height from 0.5 wl, and identifying safe distances as those which, when provided in the given optical element, yield an optical element which causes a low level of speckling i.e. an application-specific acceptable level of speckling. Such empirical testing may be valuable because, for example, the safe distance may be affected by the specific laser's spectral width and perhaps other characteristics of the laser display system. For example, a safe distance may be found to be e.g. 5 nm or 10 or 15 or 20 nm away, or ¹⁄₁₆ or ¹⁄₁₀ or ⅛ or ¼ wl away, from the "speckle-prone" roughness values which are multiples of 0.5 wl.

It is believed that ensuring that plural optical elements along the laser's path, or a fortiori all optical elements along the path, are each characterized by roughness which is as far as possible from "speckle-prone" roughness values e.g. 5 nm or 10 or 15 or 20 nm away, or ¹⁄₁₆ or ¹⁄₁₀ or ⅛ or ¼ wl away, may, at least in certain use cases and applications, be of even more value in reducing speckle.

Application-specific design considerations may of course be employed to balance speckle reduction on the one hand, vs. energy efficiency on the other hand, in selecting a roughness height which is a suitable distance away from the "speckle-prone" roughness values.

Conventional machined optical elements have a native roughness of up to a few micrometers. In order to reduce roughness, polishing (e.g. CMP—Chemical Mechanical Polishing) is implemented. Roughness of conventional optical lenses and mirrors, once polished, is normally between 0.5-5 nm. According to certain embodiments of the invention, polishing is employed as one possible method of achieving well controlled roughness, however the post-polished roughness is further from the zero than is conventional e.g. over 10 nm, over 15 nm, over 20 nm, over a few dozen nm, over 50 nm, or over 100 nm, depending on the application, the optical path, the laser characteristics and the optical and physical (materials e.g.) characteristics of elements along the path. It is appreciated that pre-testing may be used to determine how far the average roughness is to be from any integer multiple (including zero) |of 0.5×laser wavelength, if speckle is to be adequately reduced. For example, an optical element may be provided whose average roughness is 0.25×WL and tested (e.g. visually or by image processing using any desired speckle magnitude criterion e.g. a threshold on speckle contrast) to confirm the optical element whose average roughness is 0.25×WL adequately reduces speckle when positioned along the designed optical path associated with a given laser or other coherent light source. Then, a series of candidate optical elements may sequentially replace the initial optical element and be tested similarly, the first candidate having a slightly smoother surface e.g. 10 nm less roughness, the second having 20 nm less roughness, and so forth, in order to determine how well the differentially roughened candidate optical elements perform in reducing speckle. Finally, the best performing optical element may be selected (the initial element or any of the candidates), taking into account performance in reducing speckle, as well as, optionally, other considerations such as manufacturing cost and energy efficiency.

According to certain embodiments, in order to facilitate surface roughness's role in scattering the light thereby further reducing speckle, the surface texture is typically smaller than the laser beam diameter, the smaller the better, and, in addition, the surface texture should be as random as possible. Randomly texturing the surface may be achieved using any suitable method such as but not limited to shot peening, sand-blasting, etching. Both of the above surface characteristics further reduce the probability of interference, hence further reduce speckle, although a tradeoff may be appropriate to prevent undesirable reduction of reflected light and consequent reduced optical efficiency.

It is appreciated that a mechanical process which has controllable parameters (e.g. selection of tool, duration of operation, materials, slurry concentrations, temperatures etc.) which are known to yield various roughnesses, may be extrapolated or interpolated to yield an optical element (lens, display screen, mirror, diffuser, image plane etc.) having a roughness suited, to certain embodiments or use cases.

Certain embodiments described herein have a wide variety of laser display and laser sensing applications such as but not limited to laser TV, laser projectors, head up displays, OCT-Optical coherence tomography, LiDARs. 3D sensing, gesture recognition systems and other applications in which lasers are used for image generation, sensing, and/or for any application in which speckle is undesired.

It is appreciated that optical element/s along the optical path whose roughness is not an integer multiple, including zero, of half the laser's wavelength may be provided instead of or in conjunction with other prior art solutions for reducing speckle.

Figure 3:
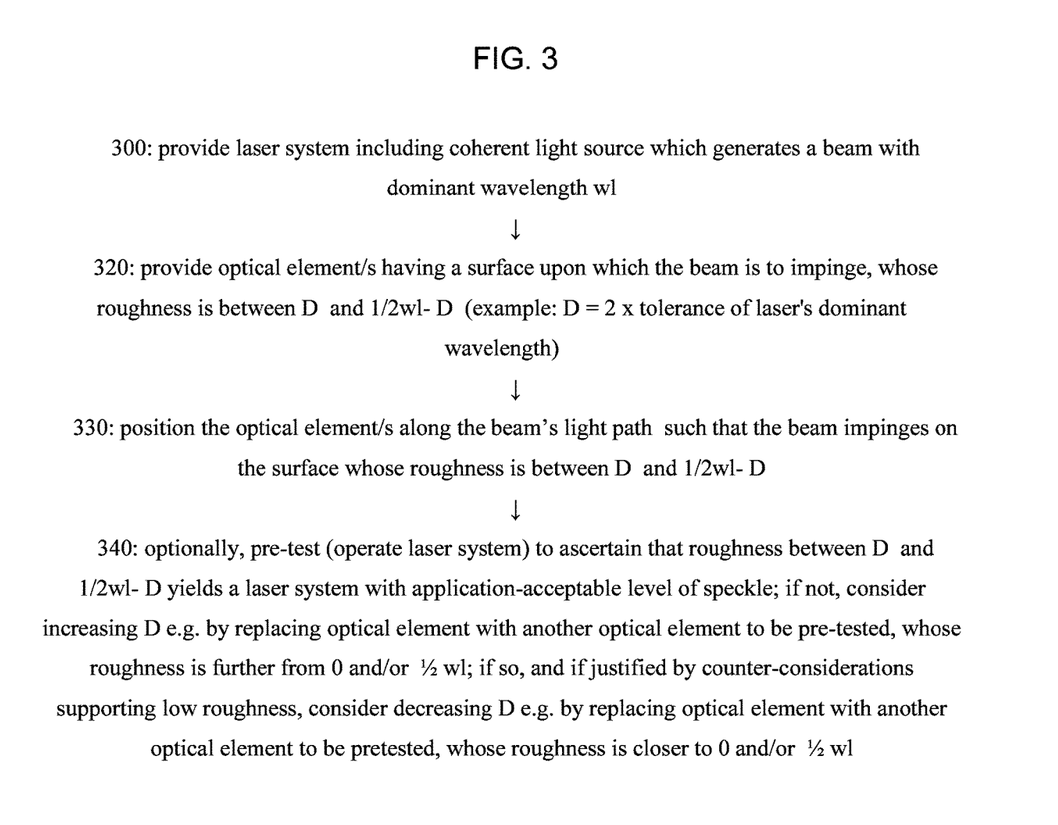
FIG. 3 is a simplified flowchart illustration of a method for generating a laser system such as but not limited to the systems of FIGS. 1, 2, according to certain embodiments.

FIG. 3 is a simplified method for generating a laser system according to certain embodiments. The method of FIG. 3 may include some or all of the following operations, suitably ordered e.g. as follows:

Operation 300: provide laser system including coherent light source which generates a beam with dominant wavelength wl.

Operation 320: provide optical element/s having a surface upon which the beam is to impinge, whose roughness is between D and ½ wl–D (example: D=2×tolerance of laser's dominant wavelength)

Operation 330: position the optical element/s along the beam's light path such that the beam impinges on the surface whose roughness is between D and ½ wl–D Operation 340: optionally, pre-test (operate laser system) to ascertain that roughness between D and ½ wl–D yields a laser system with application-acceptable level of speckle; if not, consider increasing D e.g. by replacing optical element with another optical element to be pre-tested, whose roughness is further from 0 and/or ½ wl: if so, and if justified by counter-considerations supporting low roughness, consider decreasing D e.g. by replacing optical element with another optical element to be pretested, whose roughness is closer to 0 and/or ½ wl.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

Features of the present invention, including operations, which are described in the context of separate embodiments may also be provided in combination in a single embodiment. For example, a system embodiment is intended to include a corresponding process embodiment and vice versa. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A method for using a laser, the method comprising:
using a coherent light source to generate a beam having a dominant wavelength wl; and
providing along the beam's light path, at least one optical element having a surface upon which the beam impinges, whose roughness is between D and ½ wl–D where D is double the tolerance of the laser's dominant wavelength.

2. A method according to claim 1 wherein the roughness is between ¼ and ⅛ of wl.

3. A method according to claim 1 wherein the roughness is between 75 and 90 nanometers.

4. A method according to claim 1 and also comprising providing a display surface on which an image is generated by said laser beam.

5. A method according to claim 4 wherein said optical element comprises said display surface.

6. A method according to claim 1 wherein said using comprises using plural coherent light sources to generate plural beams having respective dominant wavelengths wl1, wl2, . . . ;
and wherein said optical element has a surface whose roughness is greater than 10 nanometers and less than the shortest of said dominant wavelengths wl1, wl2, . . . .

7. A method according to claim 1 wherein said using comprises using plural coherent light sources to generate plural beams having respective dominant wavelengths wl1, wl2, . . . ;
and wherein said providing comprises providing plural optical elements for positioning along the beams' respective light-paths, having plural surfaces respectively whose respective roughnesses are greater than 10 nanometer and are D less than the dominant wavelengths wl1, wl2, . . . respectively.

8. A method according to claim 1 wherein said optical element comprises at least one of: lens, display screen, mirror, diffuser, image plane, optical cover, optical coating.

9. A method according to claim 1 wherein said laser serves at least one of: laser based display system such as a laser television or laser projector; and a laser sensing system such as a LiDAR.

10. A method according to claim 1 and also comprising providing an optical element having a surface whose roughness exceeds wl and reducing said roughness to between 10 nanometer and wl using a mechanical process.

11. A method according to claim 10 wherein said mechanical process comprises any of: etching, molding, polishing, machining, lapping, electro-polishing, grinding, boring.

12. A method according to claim 11 wherein said mechanical process comprises polishing including using a slurry having a particle size and wherein said particle size is selected to achieve roughness of between 10 nanometers and wl.

13. A method according to claim 1 and also comprising providing an optical element having a surface whose roughness is less than 10 nm and increasing said roughness to between 10 nanometers and wl using a roughening process.

14. A method according to claim 1 wherein said optical element is manufactured by a molding process characterized by a known, controlled relationship (tolerance) between a workpiece's roughness as a function of the mold's roughness and wherein the mold has a roughness which, given said tolerance, results in a workpiece whose roughness is between 10 nanometers and wl.

15. A method according to claim 11 wherein said machining comprises selecting a machining tool which yields roughness between 10 nanometers and wl in a workpiece machined thereby.

16. A method according to claim 9 wherein said laser based display system comprises a laser projector.

17. A method according to claim 1 wherein said roughness is between 10 nanometers and ½ wl–10 nm.

18. A method according to claim 1 wherein said roughness is between 15 nanometers and ½ wl–15 nm.

19. A method according to claim 13 wherein said roughening process comprises etching.

20. A laser system comprising:
a coherent light source operative to generate a beam having a dominant wavelength wl; and
positioned along the beam's light path, at least one optical element having a surface upon which the beam impinges, whose roughness is between D and ½ wl–D where D is double the tolerance of the laser's dominant wavelength.

* * * * *